US012567660B2

(12) United States Patent
Hwang et al.

(10) Patent No.: US 12,567,660 B2
(45) Date of Patent: Mar. 3, 2026

(54) APPARATUS FOR INJECTING ELECTROLYTE

(71) Applicant: LG ENERGY SOLUTION, LTD., Seoul (KR)

(72) Inventors: Joong Ha Hwang, Daejeon (KR); Geon Woo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/839,878

(22) PCT Filed: Feb. 21, 2023

(86) PCT No.: PCT/KR2023/002474
§ 371 (c)(1),
(2) Date: Aug. 20, 2024

(87) PCT Pub. No.: WO2023/158288
PCT Pub. Date: Aug. 24, 2023

(65) Prior Publication Data
US 2025/0183501 A1     Jun. 5, 2025

(30) Foreign Application Priority Data

Feb. 21, 2022   (KR) ........................ 10-2022-0022575
Feb. 21, 2023   (KR) ........................ 10-2023-0022925

(51) Int. Cl.
*H01M 50/609* (2021.01)
(52) U.S. Cl.
CPC ................................ *H01M 50/609* (2021.01)

(58) Field of Classification Search
CPC .......................... H01M 50/609; H01M 50/107
See application file for complete search history.

(56) References Cited

U.S. PATENT DOCUMENTS 3,630,788 A   *   12/1971   Hennen ............... H01M 50/609
                                                             429/77
2016/0260940 A1      9/2016   Lee et al.

FOREIGN PATENT DOCUMENTS

| | | |
|---|---|---|
| CN | 204179142 U | 2/2015 |
| JP | 3240911 B2 | 12/2001 |
| JP | 2002-367600 A | 12/2002 |
| JP | 2004-79355 A | 3/2004 |
| KR | 97-67975 A | 10/1997 |

(Continued)

OTHER PUBLICATIONS

International Search Report (PCT/ISA/210) issued in PCT/KR2023/002474, dated Jun. 2, 2023.

*Primary Examiner* — Jason K Niesz
(74) *Attorney, Agent, or Firm* — Birch, Stewart, Kolasch & Birch, LLP

(57) ABSTRACT

An apparatus for injecting an electrolyte into a can of which an upper side is opened and in which a beading part is molded to be spaced a predetermined distance from the uppermost end and protrude to the inside along a circumference. The apparatus for injecting the electrolyte may include: a nozzle configured to inject the electrolyte into the can; and a sealing member that is provided in the nozzle and is in close contact with the beading part when the nozzle injects the electrolyte into the can. A sealing groove that is in close contact with the beading part and has a concavely recessed shape may be provided in the sealing member.

15 Claims, 4 Drawing Sheets

(56)             References Cited

FOREIGN PATENT DOCUMENTS

| | | | |
|---|---|---|---|
| KR | 10-1998-075541 | A | 11/1998 |
| KR | 10-1999-018731 | A | 3/1999 |
| KR | 20-0146197 | Y1 | 6/1999 |
| KR | 10-2008-0053534 | A | 6/2008 |
| KR | 10-1075879 | B1 | 10/2011 |
| KR | 10-2015-0134566 | A | 12/2015 |
| KR | 10-2016-0106428 | A | 9/2016 |

* cited by examiner

APPARATUS FOR INJECTING ELECTROLYTE

TECHNICAL FIELD

Cross-Reference to Related Applications

The present application claims the benefit of the priority of Korean Patent Application Nos. 10-2022-0022575, filed on Feb. 21, 2022, and 10-2023-0022925, filed on Feb. 21, 2023, which are hereby incorporated by reference in their entirety.

TECHNICAL FIELD

The present invention relates to an apparatus for injecting an electrolyte, which injects the electrolyte into a can of a secondary battery.

BACKGROUND ART

Secondary batteries widely used in various digital devices and also transport means such as vehicles, have a characteristic of being capable of being repeatedly charged and discharged. In addition, research and development for increasing efficiency and improving safety are continuously carried out.

According to the shape of a battery case or according to the material of an electrode assembly, etc., the secondary batteries may be variously classified. When classified according to the shape of a battery case, a cylindrical type, a prismatic type, and a pouch are most widely manufactured.

Among the secondary batteries, the cylindrical type secondary battery has structure in which an electrode assembly 2 is embedded inside a cylindrical can 1 having an upper side opened and emptied, and a top cap part is coupled to an upper end of the can 1.

FIG. 1A is a cross-sectional view illustrating a state each of before and after an apparatus for injecting an electrolyte according to the related art is coupled to the upper side of the can of the secondary battery. FIG. 1B is an enlarged view of a portion indicated by a circle in FIG. 1A.

Referring to FIGS. 1A and 1B, the can 1 is manufactured by performing the injecting of the electrolyte after the electrode assembly 2 is embedded in a state in which the upper side is opened.

The can 1 has the upper side that is opened and may be provided with a beading part 3 having the upper end on which the top cap part is capable of being seated. The beading part 3 may be spaced a fixed distance from the uppermost end of the can 1 and protrude to the inside along a circumference of the can 1.

The apparatus for injecting the electrolyte may include a nozzle 5, and the nozzle 5 enters the upper end of the can 1 to inject the electrolyte.

Here, a sealing member 6 is coupled to an end of the nozzle 5 so that airtightness is maintained and an impact is not applied to the beading part 3 when the end is in contact with the beading part 3 of the can 1. The sealing member 6 may be an O-ring.

The sealing member 6 may be provided to have a wedge shape in which a portion in contact with the beading part 3 (i.e., an end at a lower side when the sealing member 6 is coupled to the nozzle) has a thickness that gradually decreases so that two inclined surfaces are gathered at the end.

In the related art, an angle b defined at a portion, at which the inclined surface of the sealing member 6 and the beading part 3 are in contact with each other, is generally defined to have a range of 30° to 50°. When the nozzle 5 descends, the nozzle 5 descends so that pressure at which elastic compression is generated to have a predetermined range is applied to the sealing member 6 in order to maintain the airtightness.

In this case, an area in which the inclined surface of the sealing member 6 and the beading part 3 are in close contact with each other is not sufficient and thus, there is a concern that sealing reliability may not be high.

In addition, the sealing member 6 is elastically deformed in a radially inward direction of the can 1 by reaction force applied to the beading part 3. That is, there are problems that the sealing member 6 is elastically deformed toward a side opposite to the beading part 3 and accordingly, adhesion of the sealing member 6 to the beading part 3 decreases. Accordingly, there is a problem that the electrolyte stained on the sealing member 6 remains on a surface of the beading part 3.

DISCLOSURE OF THE INVENTION

Technical Problem

An object to be solved by the present invention is to provide an apparatus for injecting an electrolyte, which increases a close contact area between a sealing member and a beading part to have a high sealing effect.

Another object to be solved by the present invention is to provide an apparatus for injecting an electrolyte, which increases adhesion between the sealing member and the beading part to have the high sealing effect.

Technical Solution

An apparatus for injecting an electrolyte according to an embodiment of the present invention may inject the electrolyte into a can of which an upper side is opened and in which a beading part is spaced a predetermined distance from an uppermost end of the can and protrudes inward along a circumference of the can. The apparatus for injecting the electrolyte may include: a nozzle configured to inject the electrolyte into the can; and a sealing member located at the nozzle, the sealing member being configured to contact the beading part when the nozzle injects the electrolyte into the can. The sealing member includes a groove configured to contact the beading part and has a concavely recessed shape.

The sealing groove may extend along an entire outer circumference of the sealing member.

An angle between an extension line of an end of the sealing groove and a top surface of the beading part may have a range of 5° to 30°.

The angle may have a range of 10° to 15°.

The sealing groove may have a curved surface.

When the sealing groove and the beading part are in contact with each other, the curved surface of the sealing groove may contact a curved portion of the beading part.

The sealing member may have a deformation groove in an outer circumference of the sealing member, and the deformation groove may be spaced a predetermined distance above the sealing groove.

A lower end of the sealing member may have a wedge portion having a thickness that gradually decreases downward. The sealing groove may be located in an outer circumference of the wedge portion.

An inner circumference of the wedge portion may have an inclined flat surface.

An apparatus for injecting an electrolyte according to an embodiment of the present invention may inject the electrolyte into a can of which an upper side is opened and in which a beading part is spaced a predetermined distance from an uppermost end of the can and protrudes inward along a circumference of the can. The apparatus for injecting the electrolyte may include: a nozzle configured to inject the electrolyte into the can; and a sealing member located at the nozzle, the sealing member may be configured to contact the beading part when the nozzle injects the electrolyte into the can. The sealing member may have a deformation groove in an outer circumference of the sealing member, and deformation groove may be located above the beading part when the nozzle injects the electrolyte into the can.

When the sealing member contacts the beading part, an inner portion of the deformation groove may be configured to be bent outward.

The sealing member may include a sealing groove configured to contact the beading part, the sealing groove may have a concavely recessed shape, and the deformation groove may be spaced a predetermined distance from the sealing groove.

The deformation groove may extend along an entire outer circumference of the sealing member, or may be provided in plurality to be spaced a predetermined interval from each other along the outer circumference of the sealing member.

The deformation groove may be provided in plurality to be spaced a predetermined interval from each other in an axial direction of the sealing member.

Advantageous Effects

According to the preferred embodiments of the present invention, the sealing groove may be provided in the sealing member so that the area in which the sealing member and the beading part are in close contact with each other may be increased. Accordingly, the sealing member may have the high sealing effect and prevent the electrolyte injected into the can from invading between the sealing member and the beading part and remaining on the beading part.

In addition, the deformation groove may be provided in the sealing member so that, compared to when the sealing member according to the related art is elastically deformed in the radially inward direction of the can, the sealing member may be deformed in the approximately opposite direction. Accordingly, the adhesion between the sealing member and the beading part may increase and the sealing member may have the high sealing effect.

Moreover, due to this elastically deformed direction of the sealing member, the occurrence of the gap between the sealing member and the beading part may be minimized to prevent the electrolyte from remaining on the beading part.

Accordingly, the electrolyte may be prevented from being ejected as the gas during the activating process performed after the injecting of the electrolyte, and the damage to and corrosion of the oxide coating of the can surface according to the evaporation of the electrolyte may be prevented.

That is, when the electrolyte is exposed to the outside, the electrolyte may react in the atmosphere to generate the hydrogen fluoride (HF) gas, and the hydrogen fluoride (HF) gas may be in contact with the can made of the aluminum to destroy the oxide coating and then induce the corrosion over time. However, the occurrence of these problems may be suppressed by the present invention.

Furthermore, the angle between the extension line of the outer end of the sealing groove and the top surface of the beading part may be 5° to 30°, preferably 10° to 15°. Accordingly, the excessive deformation of the sealing member may be suppressed, and even when the deformation occurs in the sealing member, the problem that the sealing member is separated from the beading part may be prevented.

In addition, the effects may be included which are easily predictable by those skilled in the art from the configurations according to the preferred embodiments of the present invention.

MODE FOR CARRYING OUT THE INVENTION

Figure 1A:
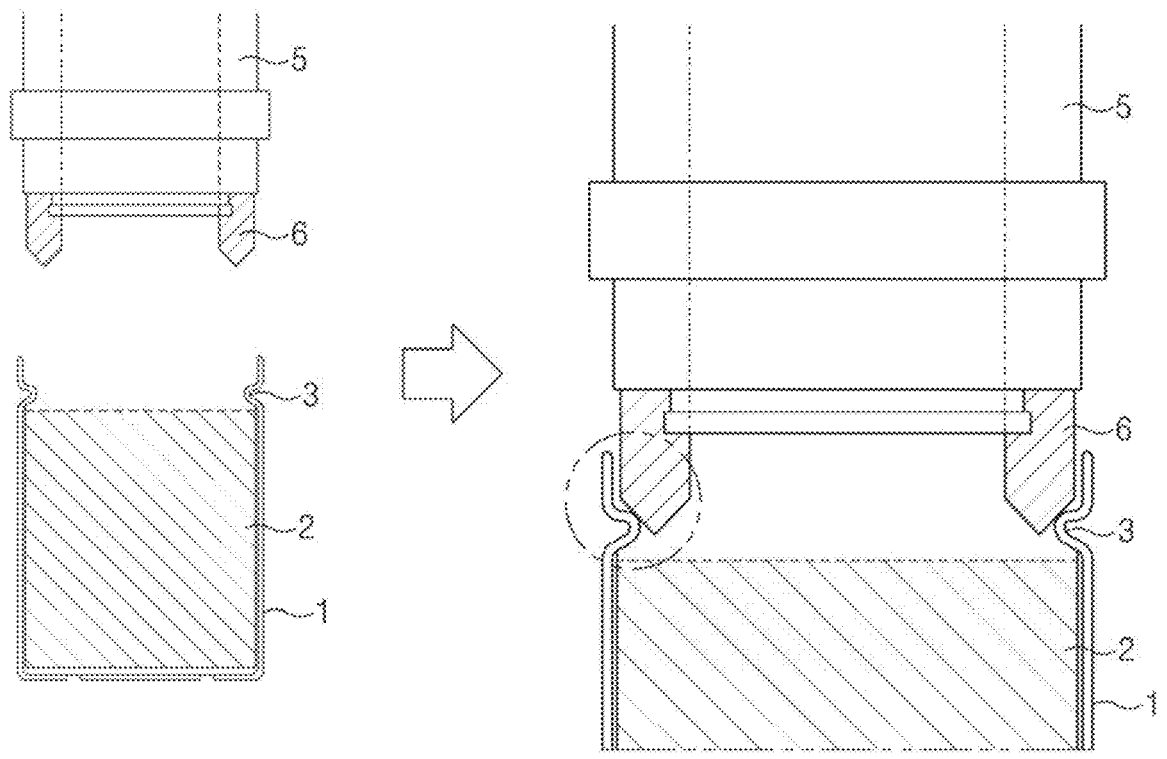
FIG. 1A is a cross-sectional view illustrating each of states before and after an apparatus for injecting an electrolyte is coupled to an upper side of a can of a secondary battery according to the related art.

Hereinafter, the present invention will be described in detail with reference to the accompanying drawings to enable those skilled in the art to which the present invention pertains to easily carry out the present invention. The present invention may, however, be embodied in different forms and should not be construed as limited to the embodiments set forth herein.

The parts unrelated to the description will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an apparatus for injecting an electrolyte, which injects the electrolyte into a can 30 of which an upper side is opened and in which a beading part 31 is molded to be spaced a predetermined distance from the uppermost end and protrude to the inside along a circumference. Hereinafter, embodiments of the present invention will be described in more detail with reference to the accompanying drawings.

Figure 2:
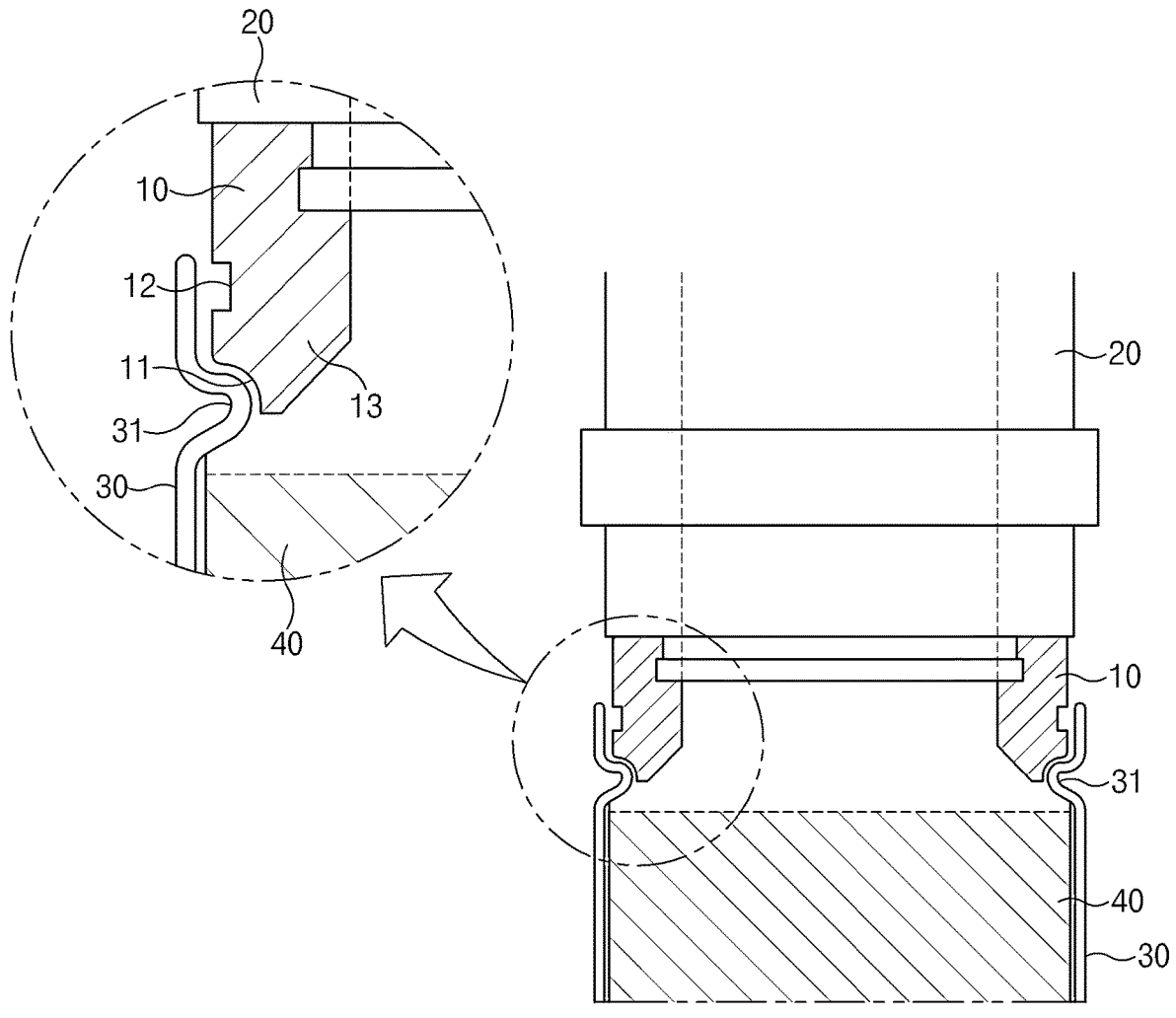
FIG. 2 is a cross-sectional view illustrating a state in which an apparatus for injecting an electrolyte is coupled to an upper side of a can of a secondary battery according to an embodiment of the present invention.
Figure 3:
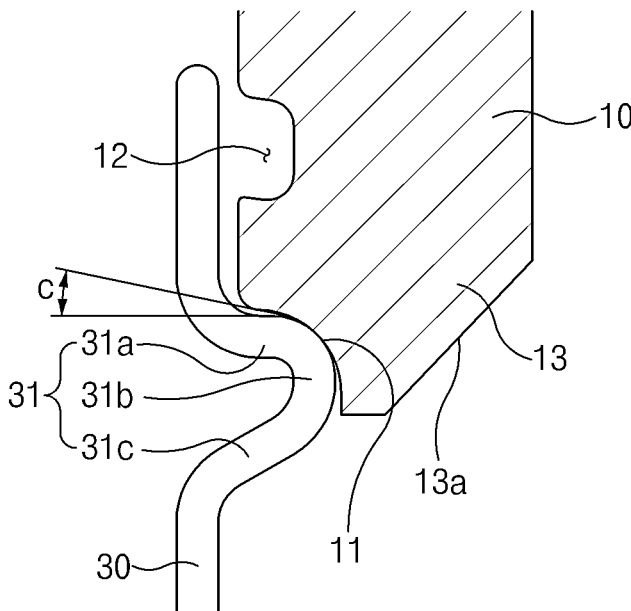
FIG. 3 is an enlarged cross-sectional view illustrating a state when a sealing member illustrated in FIG. 2 is in contact with a beading part of the can.

FIG. 2 is a cross-sectional view illustrating a state in which an apparatus for injecting an electrolyte is coupled to an upper side of a can of a secondary battery according to an embodiment of the present invention. FIG. 3 is an enlarged cross-sectional view illustrating a state when a sealing member illustrated in FIG. 2 is in contact with a beading part of the can.

The apparatus for injecting the electrolyte according to an embodiment of the present invention may include a nozzle 20 configured to inject the electrolyte into the can 30 of a secondary battery, and a sealing member 10 provided in the nozzle 20. When the nozzle 20 injects the electrolyte into the can 30, the sealing member 10 may be in close contact with the beading part 31 provided in the can 30.

The sealing member 10 may be an O-ring or a gasket and is not limited thereto.

As illustrated in FIG. 2, the sealing member 10 may form the lowest end of the apparatus for injecting the electrolyte, but is not limited thereto. For example, it may also be possible that the sealing member 10 is provided to match a lower end of the nozzle 20.

The apparatus for injecting the electrolyte may include, in addition to the nozzle 20 and the sealing member 10, a storage tank in which the electrolyte is stored, a pump through which the electrolyte is supplied from the storage tank to the nozzle 20, and the known several attached devices.

The can 30 may have the upper side that is opened, and the apparatus for injecting the electrolyte may enter the opened upper end of the can 30. In more detail, the sealing member 10 may enter the can 30 to be in close contact with the beading part 31, and the electrolyte may be injected into the can 30 through the nozzle 20.

The can 30 may have a lower side that is closed. That is, the can 30 may have a cylindrical type structure having the upper side opened and emptied, and may accommodate an electrode assembly 40. The beading part 31 protruding to the inside may be provided in the can 30 so that a top cap part is seated thereon later. The beading part 31 may be provided to be spaced a predetermined distance from the uppermost end of the can 30.

The beading part 31 may be disposed above the electrode assembly 40, and the protruding size and shape may be defined according to the size of the electrode assembly 40, the shape of the top cap part, or the like.

That is, the beading part 31 may mean a portion that is molded for seating of the top cap part in the can 30 in a direction in which an inner diameter gradually decreases. For reference, although the drawings illustrate the can 30 in a state in which the upper end stands vertically, the beading part 31 may be crimped to fix the top cap part when the top cap part is seated on the beading part 31 together with the gasket after the electrolyte is injected.

As the upper end of the can 30 is in a state of standing vertically before the top cap part is seated, the apparatus for injecting the electrolyte is capable of entering the opened upper side of the can 30.

The apparatus for injecting the electrolyte may inject a predetermined amount of the electrolyte into the can 30 through an external storage tank and a pump in a state of entering the can 30. Here, a depth at which the apparatus for injecting the electrolyte enters the can 30 may be limited to a depth at which the sealing member 10 is in close contact with the beading part 31.

An end of the nozzle 20 may be prevent from directly contacting with the beading part 31 and thus an impact and scratches is prevented from occurring by the sealing member 10, and airtightness between the can 30 and the apparatus for injecting the electrolyte may be maintained.

At least one of a sealing groove 11 or a deformation groove 12, which will be described later, may be provided in the sealing member 10. FIGS. 2 and 3 illustrate an embodiment in which both the sealing groove 11 and the deformation groove 12 are provided. However, an embodiment of the present invention is not limited thereto, and it also corresponds to an embodiment of the present invention that only one of the sealing groove 11 and the deformation groove 12 is provided in the sealing member 10.

The sealing groove 11 having a concavely recessed shape may be provided in the sealing member 10. The sealing groove 11 may be provided along the entire circumference of the sealing member 10. That is, the sealing groove 11 may have a ring shape.

When the sealing member 10 is in close contact with the beading part 31, the sealing groove 11 may have a surface that is a curved surface in order to increase a close contact area. When the sealing member 10 and the beading part 31 are in contact with each other, the surface of the sealing groove 11, which is provided as the curved surface, may be in contact with a curved portion of the beading part 31. The curved portion of the beading part 31 may be a curved portion 31b to be described later.

As the sealing groove 11 is provided in the sealing member 10, the area in which the sealing member 10 and the beading part 31 are in close contact with each other may increase. Accordingly, the sealing member 10 may have the high sealing effect, and may prevent the electrolyte injected into the can from leaking between the sealing member 10 and the beading part 31 or prevent the electrolyte from remaining on the beading part 31.

Referring to FIG. 3, the beading part 31 may include a first protrusion 31a and a second protrusion 31c, each of which protrudes to the inside of the can 30, and the curved portion 31b which connects the first protrusion 31a and the second protrusion 31c to each other and has a curved shape.

The first protrusion 31a may be disposed above the second protrusion 31c. The first protrusion 31a may include a top surface of the beading part 31, and the second protrusion 31c may include a bottom surface of the beading part 31. The curved portion 31b may include the innermost side of the beading part 31.

A boundary between the first protrusion 31a and the curved portion 31b may be defined as a point at which curvature of the curved portion 31b starts. A boundary between the second protrusion 31c and the curved portion 31b may be defined as a point at which the curvature of the curved portion 31b ends.

The first protrusion 31a may be provided to be approximately horizontal. The second protrusion 31b may be provided to be approximately inclined. The second protrusion 31c may be connected to a "portion that stands vertically in the can 30".

When the sealing groove 11 and the beading part 31 are in contact with each other, an angle C between an extension line of an outer end of the sealing groove 11 and the top surface of the beading part 31 may be 5° to 30°. The extension line may be a virtual line. In more detail, the angle C between a tangent line at the boundary between the first protrusion 31a and the curved portion 31b and the extension line may have a range of 5° to 30°. That is, the angle C is defined to have a range less than a range of 30° to 50° that is a range of an angle b (see FIG. 1B) defined between the sealing member and the beading part according to the related art.

In more detail, the angle C between the extension line of the outer end of the sealing groove 11 and the top surface of the beading part 31 may have preferably a range of 10° to 15°. Of course, this angle may be adjustable according to the shape and size of the beading part 31 and the material or shape of the sealing member 10. However, when this angle is adjusted, the angle may be preferably adjusted so that a main direction in which elastic deformation of the sealing member 10 occurs is a vertical direction (an upward and downward direction in the drawings), not a direction facing the inside of the beading part 31.

The angle between the extension line of the outer end of the sealing groove 11 and the top surface of the beading part 31 may be 5° to 30°, preferably 10° to 15°. Accordingly, the excessive deformation of the sealing member 10 may be suppressed, and even when the deformation occurs in the sealing member 10, the problem that the sealing member 10 is separated from the beading part 31 may be prevented.

Figure 1B:
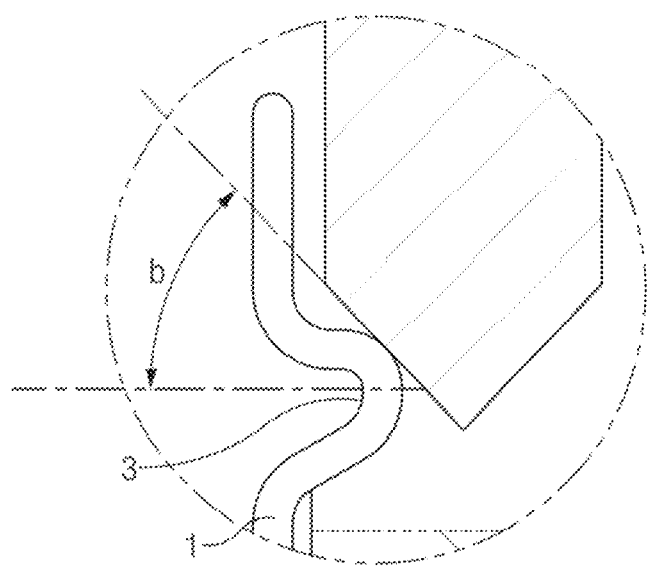
FIG. 1B is an enlarged view of a portion indicated by a circle in FIG. 1A.

Similarly to the sealing member according to the related art illustrated in FIGS. 1A and 1B, the sealing member 10 provided in this embodiment may also have a wedge shape as a shape in which an end at a lower side has a thickness that gradually decreases. That is, the sealing member 10 may have a lower end that is provided with a wedge portion 13.

The sealing groove 11 may be provided at an outer circumference of the wedge portion 13. The wedge portion 13 may have an inner circumference that is provided with an inclined flat surface 13*a*.

The deformation groove 12 disposed above the beading part 31 may be provided in an outer circumference of the sealing member 30.

The deformation groove 12 may have a concave shape. The deformation groove 12 may be spaced a predetermined distance from the sealing groove 11.

The deformation groove 12 may be provided along the entire circumference of the sealing member 10. That is, the sealing groove 10 may have a ring shape. However, an embodiment of the present invention is not limited thereto, and it may also be possible that a plurality of deformation grooves 12 are provided to be spaced an interval from each other along the circumference of the sealing member 10. The deformation groove 12 may be provided in plurality to be spaced a predetermined interval from each other in an axial direction of the sealing member 10 (i.e., a vertical direction). Of course, at least some of the plurality of deformation grooves 12 may have different sizes or shapes.

The drawings illustrate that the deformation groove 12 has a rectangle cross-section, but an embodiment of the present invention is not limited thereto.

When the apparatus for injecting the electrolyte descends to enter the can 30 so that the sealing member 10 and the beading part 31 are in close contact with each other, the sealing member 10 may be elastically deformed so that an inlet of the deformation groove 12 becomes narrow. In more detail, when the sealing member 10 is in close contact with the beading part 31, an inner portion of the deformation groove 12 may be bent outward, and the sealing member 10 may be elastically deformed in a radially outward direction of the can 30 or in an inclined direction between the radially outward direction and a downward direction of the can 30.

That is, compared to when the sealing member according to the related art is elastically deformed in the radially inward direction of the can, the sealing member 10 may be elastically deformed in the approximately opposite direction. Accordingly, adhesion between the sealing member 10 and the beading part 31 may increase and the sealing member 10 may have the high sealing effect.

Moreover, due to this elastically deformed direction of the sealing member 10, an occurrence of a gap between the sealing member 10 and the beading part 31 may be minimized to prevent the electrolyte from remaining on the beading part 31.

Accordingly, the electrolyte may be prevented from being ejected as gas during an activating process performed after the injecting of the electrolyte, and damage to and corrosion of oxide coating of a can surface according to evaporation of the electrolyte may be prevented.

That is, when the electrolyte is exposed to the outside, the electrolyte may react in the atmosphere to generate the hydrogen fluoride (HF) gas, and the hydrogen fluoride (HF) gas may be in contact with the can 30 made of the aluminum to destroy the oxide coating and then induce the corrosion over time. However, the occurrence of these problems may be suppressed by the present invention.

Moreover, compared to the structure according to the related art, the direction in which the elastic deformation of the sealing member 10 occurs may be changed to solve problems according to permanent deformation of the sealing member 10. In more detail, as the sealing member 10 is elastically deformed in the direction approximately opposite to the direction according to the related art, an elastic strain range of the sealing member 10 may be decreased by reaction force applied from the beading part 31, and a concern that the permanent deformation occurs in the sealing member 10 may be reduced. Furthermore, even when some permanent deformation occurs in the sealing member 10, the sealing effect may be maintained to be high according to the elastically deformed direction of the sealing member 10.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

| [Description of the Symbols] | |
| --- | --- |
| 10: Sealing member | 11: Sealing groove |
| 12: Deformation groove | 13: Wedge portion |
| 20: Nozzle | 30: Can |
| 31: Beading part | |

The invention claimed is:

1. An apparatus for injecting an electrolyte into a can of which an upper side is opened and in which a beading part is spaced a predetermined distance from an uppermost end of the can and protrudes inward along a circumference of the can, the apparatus comprising:
   a nozzle configured to inject the electrolyte into the can; and
   a sealing member located at the nozzle, the sealing member being configured to contact the beading part when the nozzle injects the electrolyte into the can, the sealing member including a sealing groove configured to contact the beading part, the sealing groove having a concavely recessed shape.

2. The apparatus of claim 1, wherein the sealing member has a deformation groove in an outer circumference of the sealing member, and
   wherein the deformation groove is spaced a predetermined distance above the sealing groove.

3. The apparatus of claim 1, further comprising a pump configured to connect the nozzle to a storage tank.

4. The apparatus of claim 1, wherein a lower end of the sealing member has a wedge portion having a thickness that gradually decreases downward, and
   wherein the sealing groove is located in an outer circumference of the wedge portion.

5. The apparatus of claim 4, wherein an inner portion of the wedge portion has an inclined flat surface.

6. The apparatus of claim 1, wherein the sealing groove extends along an entire outer circumference of the sealing member.

7. The apparatus of claim 6, wherein an angle between an extension line of an end of the sealing groove and a top surface of the beading part has a range of 5° to 30°.

8. The apparatus of claim 7, wherein the angle has a range of 10° to 15°.

9. The apparatus of claim 7, wherein the sealing groove includes a curved surface.

10. The apparatus of claim 9, wherein, when the sealing groove and the beading part are in contact with each other, the curved surface of the sealing groove contacts a curved portion of the beading part.

11. An apparatus for injecting an electrolyte into a can of which an upper side is opened and in which a beading part is spaced a predetermined distance from an uppermost end of the can and protrudes inward along a circumference of the can, the apparatus comprising:

a nozzle configured to inject the electrolyte into the can; and a sealing member located at the nozzle, the sealing member being configured to contact the beading part when the nozzle injects the electrolyte into the can, the sealing member including a deformation groove in an outer circumference of the sealing member, the deformation groove being located above the beading part when the nozzle injects the electrolyte into the can.

12. The apparatus of claim 11, wherein the deformation groove extends along an entire outer circumference of the sealing member, or wherein the deformation groove is provided in plurality to be spaced a predetermined interval from each other along the outer circumference of the sealing member.

13. The apparatus of claim 11, wherein the deformation groove is provided in plurality to be spaced a predetermined interval from each other in an axial direction of the sealing member.

14. The apparatus of claim 11, wherein, when the sealing member contacts the beading part, an inner portion of the deformation groove is configured to be bent outward.

15. The apparatus of claim 14, wherein the sealing member includes a sealing groove configured to contact the beading part, the sealing groove having a concavely recessed shape, and wherein the deformation groove is spaced a predetermined distance from the sealing groove.

\* \* \* \* \*